April 26, 1932.  W. DENYER  1,855,945
GAUGE FOR CUTTING TIMBER
Filed Jan. 22, 1931
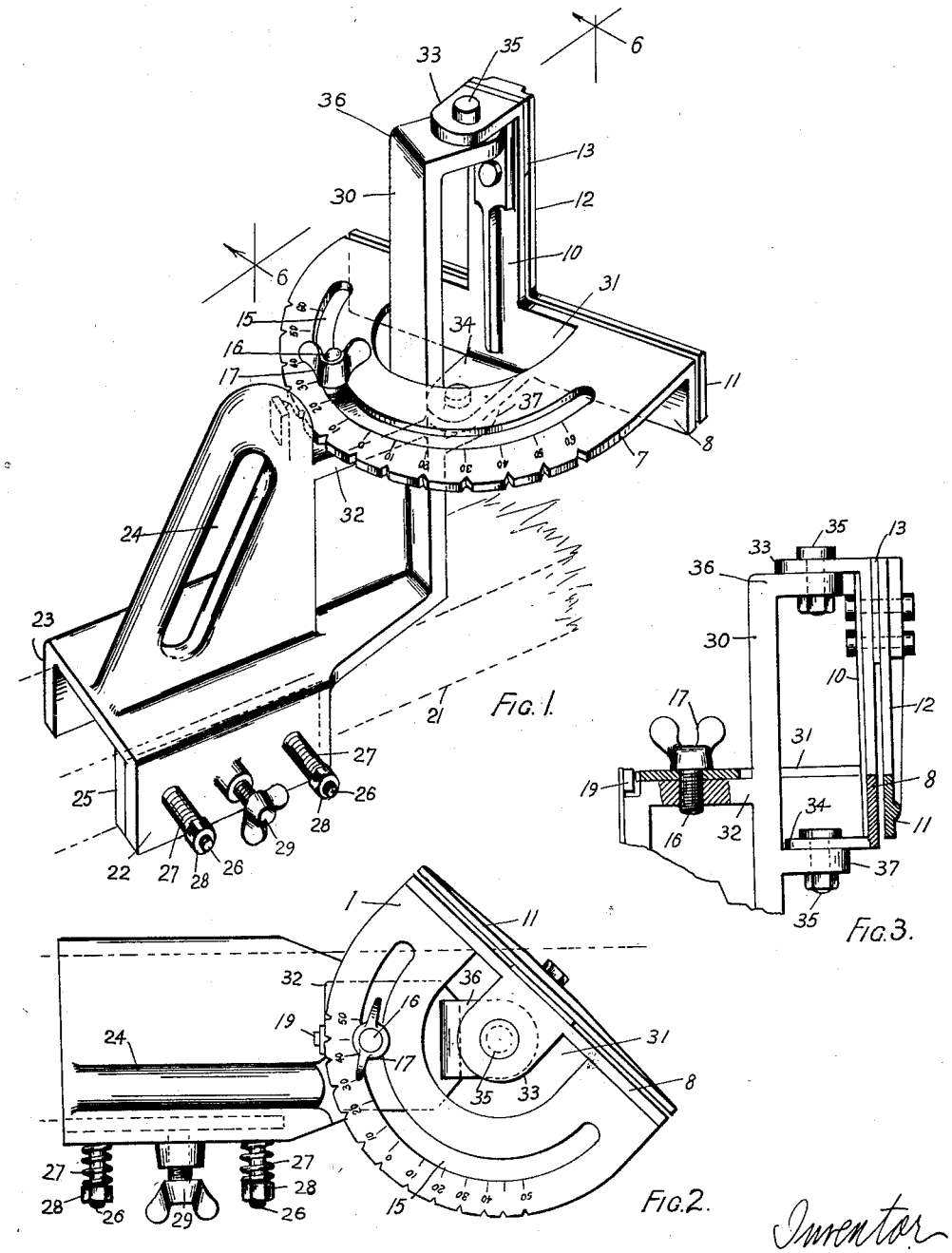

Patented Apr. 26, 1932

1,855,945

UNITED STATES PATENT OFFICE

WALTER DENYER, OF CHATSWOOD, SYDNEY, NEW SOUTH WALES, AUSTRALIA

GAUGE FOR CUTTING TIMBER

Application filed January 22, 1931, Serial No. 510,525, and in Australia March 7, 1930.

This invention relates to the cutting, by means of a handsaw, of timber used in cabinet and carpentry work, and is devised with the object of providing an improved gauge including a guide for the saw adjustable to any angle and so constructed that the saw is maintained in a vertical plane throughout the cut, to be used in cutting mitres or other inclined (or square) cuts in timber.

The invention consists in an appliance including a saw guide, means for supporting the guide and means for adjusting and locking it in adjusted position, all of which are hereinafter described in the preferred form, and a base with which the guide support is integral, said base being adapted to be clamped to the piece of timber to be cut and equipped with means for gripping it with the hand so that it may be conveniently carried from place to place as required.

The accompanying drawings to which reference will now be made depict a preferred form, of the invention, in which, Fig. 1 is a perspective view of the appliance, Fig. 2 is a plan view thereof and Fig. 3 a fragmentary sectional elevation on plane 6, 6 of Fig. 1.

As shown in the drawings, the base is adapted to be fitted on to the piece of timber to be cut and indicated (by dotted lines) at 21 (Fig. 1), and it consists in a rectangular piece having opposed flanges 22 and 23 and is formed with a hand grip 24. On the inside of flange 22 is a movable clamping plate 25 in which are fitted guide studs 26, 26 passing through the flange 22 and on which respectively are coil springs 27, 27 backed by nuts 28, 28. A wing-headed clamping screw 29 is screwed through flange 22 and abuts against the plate 25. By this construction and by adjustment of screw 29 the base may be clamped to timbers of various sizes as will be well understood.

Formed integrally with the base is a pillar 30 which passes through an opening 31 in the semi-circular plate 7. The upper portion of the structure connecting the column 30 to the base is constituted by a horizontal plate 32 which carries the stud 16 which engages the arcuate slot 15 in the plate 7 and is fitted with the clamping nut 17. This plate 32 also carries the spring detent 19 engaging notches in the edge of plate 7.

The saw guide comprises T-shaped elements 8, 10 and 11, 12 separated by the spacing washer 13, element 8, 10 being integral with plate 7 and having upper and lower lugs 33, 34 pivotally attached respectively, by bolts 35, 35, to lugs 36 and 37 formed integrally with the column 30. These bolts constitute the pivot about which the saw guide is angularly adjusted.

In use, the base is clamped on to the timber 21 to be cut, and the saw-guide is adjusted, on the segmental plate 7, to the required angle. A saw is inserted between the saw guide elements 8, 10 and 11, 12 and is used to cut the timber in the usual way, the guide ensuring that the saw remains at the required cutting angle to the timber.

What I claim and desire to secure by Letters Patent is:—

A portable gauge for cutting timber, including an inverted U shaped base and a clamp plate therein to engage the timber to be cut, a vertical standard formed on said base and having two laterally formed lugs thereon, an inverted T shaped element comprising one member of a saw guide and having two lugs thereon pivotally engaging the lugs of the standard, and having a horizontal apertured segmental adjustment plate formed thereon which lies about the said standard, a nut and stud engaging a segmental aperture in the plate to clamp the latter in adjusted position, and an inverted T shaped element with stiffening ribs thereon, complementary to and affixed to the former T shaped element with a constant mutual spacing to constitute a saw guide open at the bottom.

Signed at Sydney this twenty-third day of December, A. D. 1930.

WALTER DENYER.